United States Patent
Puchiano et al.

(10) Patent No.: US 9,413,564 B2
(45) Date of Patent: Aug. 9, 2016

(54) TRANSMITTING ELECTRICAL POWER AND COMMUNICATION SIGNALS

(71) Applicant: Vetco Gray Controls Limited, Bristol (GB)

(72) Inventors: Silviu Puchiano, Bristol (GB); Graham Morley, Neath & Port Talbot (GB); Hilton Smart, Bristol (GB); Julian Davis, Bristol (GB); Steven Lewis Charles Simpson, Bristol (GB)

(73) Assignee: Vetco Gray Controls Limited, Bristol (GB)

( * ) Notice: Subject to any disclaimer, the term of this patent is extended or adjusted under 35 U.S.C. 154(b) by 752 days.

(21) Appl. No.: 13/706,439

(22) Filed: Dec. 6, 2012

(65) Prior Publication Data

US 2013/0148747 A1 Jun. 13, 2013

(30) Foreign Application Priority Data

Dec. 7, 2011 (EP) .................................. 11192473

(51) Int. Cl.
*H04L 25/02* (2006.01)
*H04B 3/54* (2006.01)

(52) U.S. Cl.
CPC .............. *H04L 25/026* (2013.01); *H04B 3/546* (2013.01); *H04B 2203/5412* (2013.01); *H04B 2203/5475* (2013.01)

(58) Field of Classification Search
CPC ................. H04L 25/026; H04B 3/546; H04B 2203/5412; H04B 2203/5475
USPC ........................................................... 307/1
See application file for complete search history.

(56) References Cited

U.S. PATENT DOCUMENTS

| 4,689,620 A | 8/1987 | Wondrak |
| 5,835,537 A | 11/1998 | Ichii et al. |
| 2005/0200497 A1* | 9/2005 | Smithson et al. ........... 340/853.3 |
| 2006/0038661 A1 | 2/2006 | Reinhold et al. |
| 2013/0100966 A1* | 4/2013 | Huang et al. ................. 370/503 |

FOREIGN PATENT DOCUMENTS

GB 2335334 A 9/1999

OTHER PUBLICATIONS

Search Report and Written Opinion from corresponding EP application No. 11192473.4, dated May 7, 2012.

* cited by examiner

*Primary Examiner* — Thienvu Tran
*Assistant Examiner* — Kevin J Comber
(74) *Attorney, Agent, or Firm* — GE Global Patent Operation

(57) ABSTRACT

A system for transmitting electrical power and communication signals is provided. The system comprises a transmission line, a source of electrical power for supplying electrical power to the transmission line, a first communication unit configured to supply communication signals to the transmission line, a power extraction unit configured to extract and use electrical power from the transmission line, a second communication unit configured to receive communication signals from the transmission line; and a control unit configured to control operation of the system. The source supplies electrical power to the transmission line for respective periods of time which are different from respective periods of time in which the first communication unit supplies communication signals to the transmission line.

17 Claims, 3 Drawing Sheets

TRANSMITTING ELECTRICAL POWER AND COMMUNICATION SIGNALS

BACKGROUND OF THE INVENTION

Embodiments of the present invention relate to transmitting electrical power and communication signals. One of the enabling techniques used in offshore production control systems for hydrocarbon extraction wells, to transmit control and instrumentation signals between topside equipment and subsurface equipment installed on the seabed, is the use of communications-on-power (COP) where communication signals are superimposed on an electrical power signal and transmitted simultaneously with the power signal along a power transmission line in an umbilical cable.

This method is employed to reduce the number of electrical lines needed within the umbilical cable, which provides the main interface between topside and subsurface equipment for hydraulic and electrical power. Using COP eliminates the need for separate power and communication lines within the umbilical cable, thereby reducing its overall cost. However, this technique does have some inherent disadvantages as follows.

At the subsea equipment level there is a need to utilize bulky equipment, such as communications blocking filters and diplexers, to separate and retrieve the communication signals from the power signal and this process can result in electrical noise and transients being generated. These subsea components also consume electrical power The quality of the electrical power generated topside and transmitted through the umbilical cable may be poor and contain electrical noise and harmonics of the typically 50/60 Hz electrical power frequency and these may interfere with the lower power communication signals which are superimposed on the electrical power signal.

Sudden voltage transients (such as those caused by switching surges or sudden changes to the electrical load) can interfere with the high frequency communication signals. A reduction or elimination of these effects would lead to improvement in the reliability of the communications link and in the overall accuracy of the information transmitted.

BRIEF DESCRIPTION OF THE INVENTION

According to an embodiment of the present invention, a system for transmitting electrical power and communication signals is provided. The system comprises a transmission line, a source of electrical power for supplying electrical power to the transmission line, a first communication unit configured to supply communication signals to the transmission line, a power extraction unit configured to extract and use electrical power from the transmission line, a second communication unit configured to receive communication signals from the transmission line; and a control unit configured to control operation of the system. The source supplies electrical power to the transmission line for respective periods of time which are different from respective periods of time in which the first communication unit supplies communication signals to the transmission line.

According to another embodiment of the present invention, a method of transmitting electrical power and communication signals in a system is provided. The system comprises a transmission line, a source of electrical power, a first communication unit, a power extraction unit configured to extract and use electrical power from the transmission line, and a second communication unit configured to receive communication signals from the transmission line. The method comprises supplying communication signals from the first communication unit to the transmission line, and supplying electrical power to the transmission line for respective periods of time which are different from respective periods of time in which communication signals are supplied from the first communication unit to the transmission line.

These and other aspects and advantages of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. Moreover, the drawings are not necessarily drawn to scale and, unless otherwise indicated, they are merely intended to conceptually illustrate the structures and procedures described herein.

DETAILED DESCRIPTION OF THE EXEMPLARY EMBODIMENTS OF THE INVENTION

Two different offshore applications which use similar equipment configurations are described to illustrate how a time division multiplexing technique (usually used for transmitting different types of communications data in separate sequenced time slots) can be used as an alternative to the current COP technique to transmit both electrical power and communication signals along the same transmission line. However, embodiments of the invention are applicable to other situations where electrical power and communication signals are to be transmitted along the same transmission line.

Figure 1:
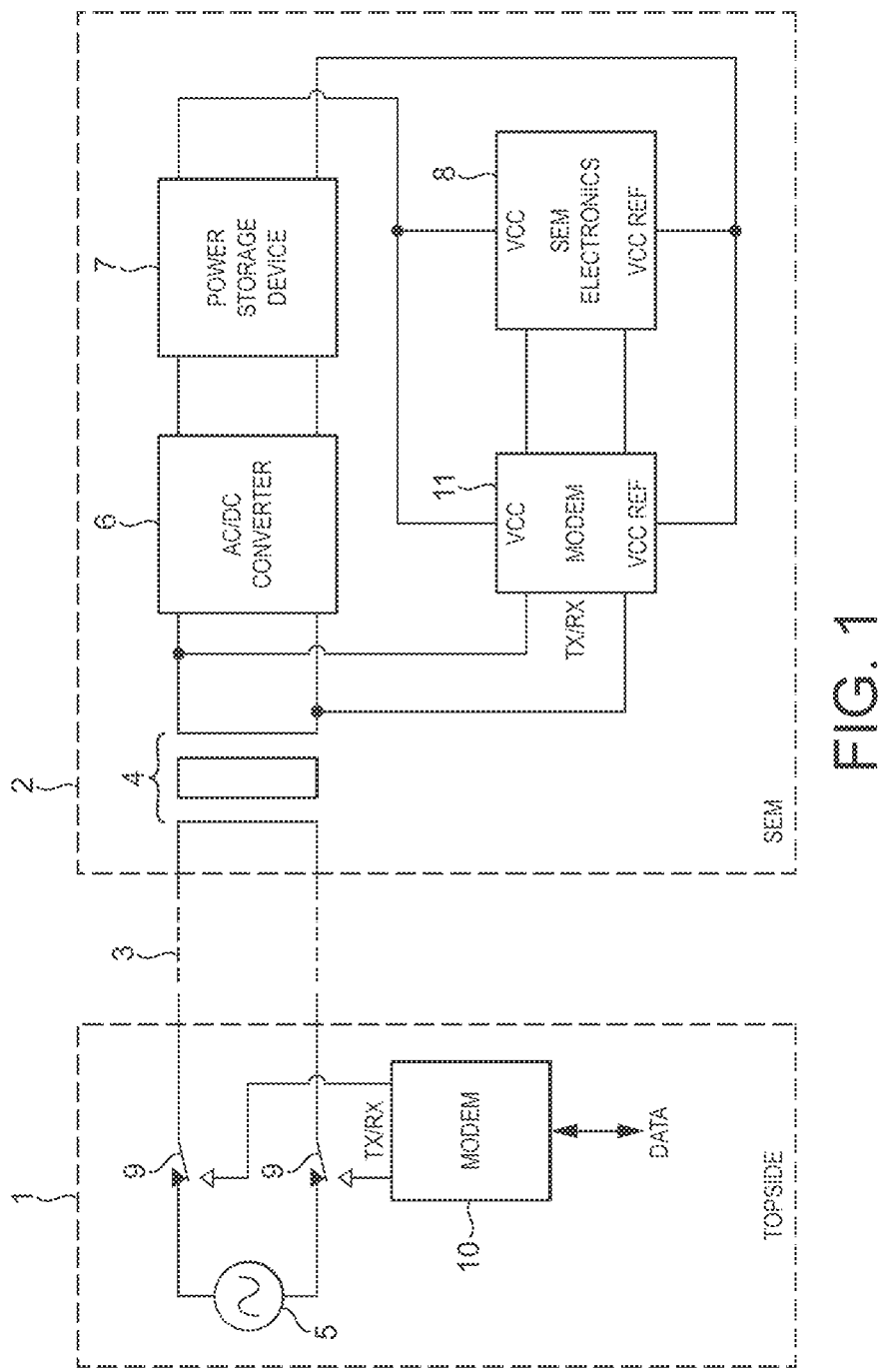
FIG. 1 is a schematic diagram of an embodiment of the invention.

FIG. 1 illustrates the use of an embodiment of the invention in a production control system of a subsea hydrocarbon well when applied to the transmission of communication signals (control and instrumentation) between topside and subsea equipment along a transmission line in an umbilical cable. The figure shows the interface between a topside surface platform 1 and a subsea end, specifically at a subsea electronics module (SEM) 2, via a transmission line 3 in an umbilical cable. The SEM 2 is usually physically housed inside a subsea control module. The SEM contains its own transformer, power supply and diplexer, together with a series of electronic cards, which perform various functions such as communication, interfacing with instrumentation and sensors, controlling valves and hydraulics.

Reference numeral 5 designates an AC electrical power source at the surface platform 1; reference numeral 9 designates a surface switch at the surface platform which, in a first position couples power from power source 5 to transmission line 3 and, in a second position connects a modem 10 to the transmission line 3 for the transmission and reception of communication signals to and from the SEM 2; and reference numeral 4 designates a transformer in the SEM 2 having a primary winding connected across transmission the line 3 of the umbilical cable and a secondary winding connected across a conventional AC/DC converter 6 (such as a bridge rectifier and electrical filter) in the SEM 2 and also across a modem 11 in the SEM 2 for the transmission and reception of communication signals to and from the SEM 2.

Converter 6 is connected to a subsea electrical power storage device 7 (for example in the form of a bank of so-called "supercapacitors"). Storage device 7 is used to supply electrical power to the modem 11 and also SEM electronics 8 (comprising a card rack and printed circuit boards) coupled with the modem 11.

Communication signals and electrical power are extracted from the transmission line 3 in the umbilical cable by means of transformer 4, which also provides galvanic isolation. (Separate transformers for power and communication signals can be used if required—see below). The incoming electrical power and the communication signals are each extracted separately, as follows.

When switch 9 is in the first position, electrical power is transmitted and the power in the power storage device 7 is built up and is used to provide electrical power to the SEM electronics 8 and modem 11. When the electrical power from topside is switched off by operation of the surface switch 9, for a short interval the SEM electronics 8 is powered from the power held in the power storage device 7, the surface switch 9 connecting the surface modem 10 to the transmission line 3, allowing communication to and from the subsea modem 11, communication signals being fed to appropriate devices in the SEM electronics 8. When the power becomes insufficient as sensed by the SEM electronics 8 (i.e. when the voltage of power stored in power storage device 7 drops below a threshold) a message from modem II to modem 10 causes communication to be stopped and power again switched on by operation of the switch 9. Power storage device 7 is then recharged.

A typical mode of operation is as follows: electrical power is transmitted via the transmission line 3 within the umbilical cable for a period of time calculated to be sufficient to fully charge the power storage device 7; the electrical power is then switched off by the switch 9, the communication of a message from the SEM electronics 8, via the modems 11 and 10, confirming that the storage device 7 is adequately charged. If this message is not received at the surface, the switch 9 automatically reverts to the power mode for a further period of time. This process is repeated until the power storage device 7 is adequately charged; during the communication mode, the power stored in the power storage device 7 is monitored by the SEM electronics 8, and when its voltage has fallen below an acceptable threshold level, a message is sent to the surface from the modem 11 to the modem 10 to switch off communications and revert back to the power mode; and the process is repeated continuously, power and communication signals being multiplexed at a rate governed by the recharging requirements of the power storage device 7.

By using the above configuration, the use of conventional power supplies and bulky equipment such as communications blocking filters and diplexers is eliminated.

Figure 2:
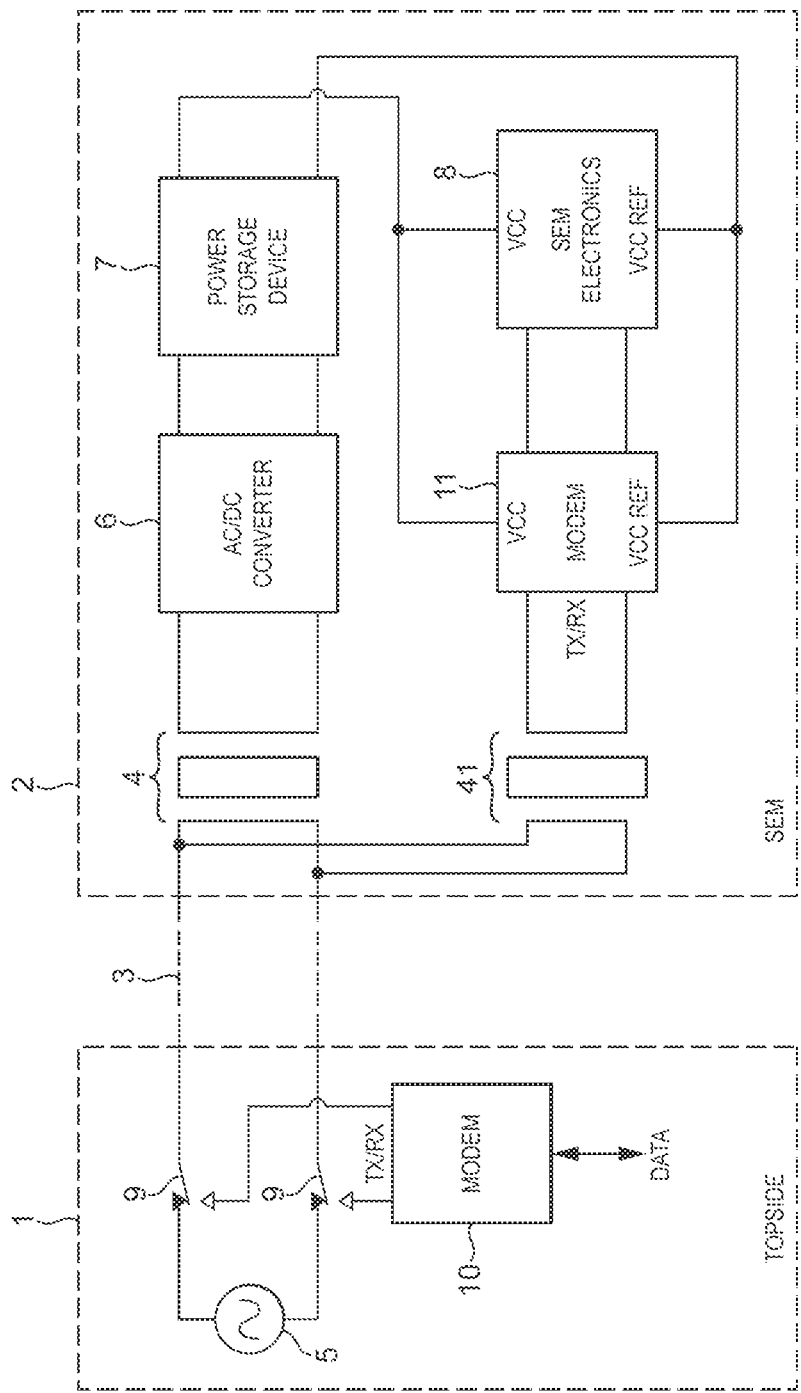
FIG. 2 is a schematic diagram of a modified form of the FIG. 1 embodiment.

FIG. 2 illustrates a modification of the FIG. 1 embodiment in which transformer 4 is used for extracting power from transmission line 3 and a separate transformer 41 is used for extracting communication signals from transmission line 3 and transmitting communication signals via transmission line 3, a primary winding of transformer 41 being connected across transmission line 3 and a secondary winding of transformer 41 being connected across modem 11.

Figure 3:
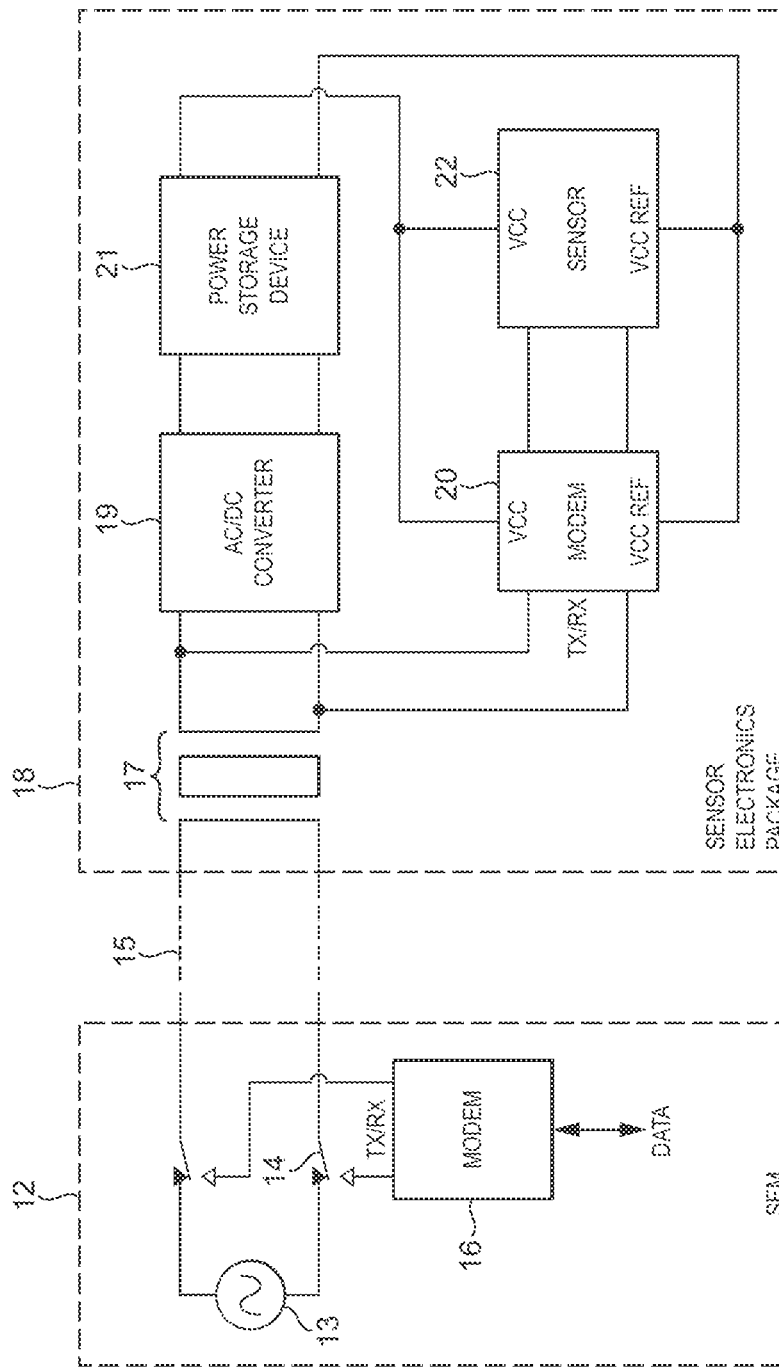
FIG. 3 is a schematic diagram of another embodiment of the invention.

FIG. 3 illustrates the use of a technique according to an embodiment of the present invention to provide electrical power to, as well as communication signals between, remote sensors used subsea and an SEM in a production control system for a hydrocarbon well. This eliminates the need for each sensor to have its own electrical power supply. The equipment configuration at a remote sensor electronics package is similar to that shown in FIG. 1.

Reference numeral 12 designates an SEM which includes an AC electrical power source 13; reference numeral 14 designates a switch in the SEM 12, which in a first position, couples power from source 13 to a transmission line 15 and, in a second position, connects a modem 16 to the transmission line 15 for the transmission and reception of communication signals from and by the SEM 12; and reference numeral 17 designates a transformer in a remote sensor electronics package 18, having a primary winding connected across line 15 and a secondary winding connected across a conventional AC/DC converter 19 (such as a bridge rectifier and electrical filter) in the package 18 and also across a modem 20 in the package 18 for the reception and transmission of communication signals from and to the SEM 12.

Converter 19 is connected to a subsea electrical power storage device 21 (for example in the form of a bank of so-called "supercapacitors") in the package 18, power storage device 21 being used to supply electrical power to the modem 20 and also to a sensor unit 22 in the package 18.

Communication signals and electrical power are extracted from the transmission line 15 by means of transformer 16, which also provides galvanic isolation. (Separate transformers for power and signals can be used if required). The incoming electrical power and the communication signals are each extracted separately, as follows.

When switch 14 is in the first position, electrical power is transmitted and the power in the power storage device 21 is built up and is used to provide electrical power to the sensor unit 22 and modem 20. When the electrical power from SEM 12 is switched off by operation of the switch 14, for a short interval the sensor unit 22 is powered from the power held in the storage device 21, the switch 14 connecting the modem 16 to the line 15, allowing communication to and from the modem 20. When the stored power in power storage device 21 becomes insufficient since its voltage has dropped below a threshold (as sensed by unit 22), modem 20 sends a message to modem 16 so that communication is stopped and power again switched on by the operation of the switch 14. The power storage device 21 is then recharged and when the stored power becomes sufficient, as sensed by the sensor unit 22, a message from modem 20 to modem 16 causes switch 14 to be operated so that communication can restart.

The communication signals are control signals to the sensor unit 22 and data from the sensor unit 22, transmitted and received via the modems 16 and 20.

As with the system of FIG. 1, the bi-directional transmission lasts as long as the supply voltage from the power storage device 21 is within operational limits, otherwise it returns to the power supply mode.

Embodiments of the present invention retain the use of a single transmission line to carry both electrical power and communication signals. A reduction in harmonic, noise and transients caused by the electrical power and signal extraction equipment can be obtained, resulting in a better signal to noise ration and causing less communication signal degradation.

Embodiments of the present invention also enable simpler data transmission. Embodiments also eliminate the need for bulky, noisy, blocking filters and diplexers to separate the communication signals from the electrical power, therefore saving cost and space.

For sensor applications, embodiments enable elimination of the need to provide a dedicated power supply for each sensor with its associated cables and connectors at the SEM and sensor unit, thus saving cost and space.

Embodiments of the present invention also enable less power consumption subsurface.

According to one embodiment, distribution architecture to field sensors is reduced by using a local area network (LAN) thus making further economies in cables and connectors and improving reliability further. Other topologies are also possible.

According to an embodiment of the present invention from one aspect, there is provided a system for transmitting electrical power and communication signals, comprising: a transmission line; a source of electrical power for supplying electrical power to the transmission line; first communication means, for supplying communication signals to the transmission line; power extraction means for extracting and using electrical power from the transmission line; second communication means for receiving communication signals from the transmission line; and control means for controlling operation of the system in such a way that, in use of the system, the power source supplies electrical power to the transmission line for respective periods of time which are different from respective periods of time in which the first communication means supplies communication signals to the transmission line.

According to an embodiment of the present invention from another aspect, there is provided a method of transmitting electrical power and communication signals, the method comprising: providing a transmission line, a source of electrical power, first communication means, power extraction means for extracting and using electrical power from the transmission line and second communication means for receiving communication signals from the transmission line, which method further comprises controlling operation such that the power source supplies electrical power to the transmission line for respective periods of time which are different from respective periods of time in which the first communication means supplies communication signals to the transmission line.

According to an embodiment, the second communication means is adapted for supplying communication signals to said transmission line for reception by said first communication means during periods of time when said power source is not supplying electrical power to the transmission line.

According to an embodiment, said power extraction means includes electrical power storage means for storing electrical power extracted from said transmission line. In this case, said control means could be such that said first communication means can supply communication signals to said transmission line unless the voltage of power stored in said storage means drops below a threshold level, in response to which communication signals from said first communication means are not supplied to said line but electrical power is supplied to said line from said source until the voltage of power stored in said storage means is not below said threshold, in response to which said first communication means can supply communication signals to said transmission line.

Said control means could include switch means which, in a first condition, couples said power source to said transmission line and, in a second condition, couples said first communication means to said line. In this case, said control means could be such that, if the voltage of power stored in said storage means is below said threshold, such switch means is in said first condition but if it is not below said threshold said switch means is in said second condition. Then, said control means could be such that said switch means is switched between said conditions by signals from said second communication means.

According to an embodiment, said power source is an AC power source, said extracting means comprising a transformer having a primary winding connected across said transmission line and a secondary winding connected across rectifier means.

A system or method according to embodiments of the present invention could comprise a control system for a subsea hydrocarbon well or a method of transmitting power and communication signals in such a control system. In these cases, said first communication means could each be at a topside location, said power extraction means and said second communication means being in a subsea electronics module and said transmission line being in an umbilical cable between said topside location and the subsea electronics module. Alternatively, said power source and said first communication means could be in a subsea electronics module, said power extraction means and said second communication means being in a subsea sensor arrangement and said transmission line being between said subsea electronics module and said subsea sensor arrangement.

In the following embodiments of the invention, electrical energy (at the power frequency) flowing down a transmission line is switched off for a very small fraction of time to allow the communication of information in the form of higher frequency communication signals to be transmitted along the same transmission line. In this way, the power and communication signals are interleaved (as opposed to one being superimposed on the other) as in time division multiplexing and there are substantially no interference problems between them. The communication signals are high frequency in nature compared to the electrical power and therefore can be transmitted in a fraction of the time taken by electrical power transmission. A duty cycle can therefore be achieved which ensures that there is minimal loss of electrical power and this together with the use of subsurface electrical power storage (such as a capacitor bank), can provide the constant electrical power needed by subsurface equipment.

Two modes of operation are employed, as follows. A power supply mode wherein an AC electrical power signal is transmitted to receiving equipment is converted to DC and an electrical storage device is charged up with energy. When the energy stored is sufficient, the system goes into a communication signal transmission mode. In a communication signal transmission mode, wherein, when the appropriate supply voltage is achieved, communication signals are transmitted and the mode lasts for as long as the power supply is within operational limits, and after which time the system reverts to the power supply mode.

It will be appreciated that the invention, where the waveform transmitted consists of an electrical power signal (e.g. 50 Hz sinusoidal) interleaved with communication signals has application in other fields than offshore production control systems.

Thus, while there has been shown and described and pointed out fundamental novel features of the invention as applied to exemplary embodiments thereof, it will be understood that various omissions and substitutions and changes in the form and details of the devices illustrated, and in their operation, may be made by those skilled in the art without departing from the spirit of the invention. Moreover, it is expressly intended that all combinations of those elements and/or method steps which perform substantially the same function in substantially the same way to achieve the same results are within the scope of the invention. Furthermore, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A system for transmitting electrical power and communication signals, the system comprising:
   a transmission line;
   a source of electrical power for supplying electrical power to the transmission line;
   a first communication unit configured to supply communication signals to the transmission line;
   a power extraction unit configured to extract and use electrical power from the transmission line;
   a second communication unit configured to receive communication signals from the transmission line; and
   a control unit configured to control operation of the system,
   wherein the source supplies electrical power to the transmission line for respective periods of time which are different from respective periods of time in which the first communication unit supplies communication signals to the transmission line,
   wherein the power extraction unit comprises an electrical power storage device for storing electrical power extracted from the transmission line, and
   wherein if the voltage of power stored in the storage device drops below a threshold level, communication signals from the first communication unit are not supplied to the transmission line and electrical power is supplied to the transmission line from the source until the voltage of power stored in the storage device is not below the threshold level.

2. The system according to claim 1, wherein the second communication unit is further configured to supply communication signals to the transmission line for reception by the first communication unit during periods of time when the source is not supplying electrical power to the transmission line.

3. The system according to claim 1, wherein the control unit further comprises a switch, wherein the switch couples the source to the transmission line in a first condition and wherein the switch couples the first communication unit to the transmission line in a second condition.

4. The system according to claim 3, wherein the switch is in the first condition if the voltage of power stored in the storage device is below a threshold level, and the switch is in the second condition if the voltage of power stored in the storage device is not below the threshold level.

5. The system according to claim 4, wherein the switch is switched between the first condition and the second condition by the control unit based upon signals from the second communication unit.

6. The system according to claim 1, wherein the source is an AC power source, and wherein the power extraction unit comprises a transformer having a primary winding connected across the transmission line and a secondary winding connected across a rectifier.

7. The system according to claim 1, further comprising a control system for a subsea hydrocarbon well.

8. The system according to claim 7, wherein the source and the first communication unit are at a topside location, wherein the power extraction unit and the second communication unit are in a subsea electronics module, and wherein the transmission line is in an umbilical cable between the topside location and the subsea electronics module.

9. The system according to claim 7, wherein the source and the first communication unit are in a subsea electronics module, wherein the power extraction unit and the second communication unit are in a subsea sensor arrangement, and wherein the transmission line is between the subsea electronics module and the subsea sensor arrangement.

10. The system of claim 9, wherein the subsea sensor arrangement is not equipped with its own electrical power supply.

11. The system of claim 1, wherein electrical power is supplied to the transmission line until a threshold level is reached.

12. A method of transmitting electrical power and communication signals in a system comprising a transmission line, a source of electrical power, a first communication unit, a power extraction unit configured to extract and use electrical power from the transmission line, and a second communication unit configured to receive communication signals from the transmission line, the method comprising:
   supplying communication signals from the first communication unit to the transmission line; and
   supplying electrical power to the transmission line for respective periods of time which are different from respective periods of time in which communication signals are supplied from the first communication unit to the transmission line,
   wherein the power extraction unit comprises an electrical power storage device for storing electrical power extracted from the transmission line, and
   wherein if the voltage of power stored in the storage device drops below a threshold level, communication signals from the first communication unit are not supplied to the transmission line and electrical power is supplied to the transmission line from the source until the voltage of power stored in the storage device is not below the threshold level.

13. The method according to claim 12, further comprising supplying communication signals from the second communication unit to the transmission line for reception by the first communication unit during periods of time when the source is not supplying electrical power to the transmission line.

14. The method according to claim 12, wherein the system further comprises a switch, wherein the switch couples the power source to the transmission line in a first condition and wherein the switch couples the first communication unit to the transmission line in a second condition.

15. The method according to claim 14, further comprising switching the switch to the first condition if the voltage of stored power is below a threshold level and switching the switch to a second condition if the voltage of stored power is not below the threshold level.

16. The method according to claim 15, wherein switching the switch between the first condition and the second condition is performed based on signals from the second communication unit.

17. The system of claim 11, wherein once the threshold level reached, the system switches to a transmission mode.

* * * * *